(12) United States Patent
Ji et al.

(10) Patent No.: US 11,917,167 B2
(45) Date of Patent: Feb. 27, 2024

(54) IMAGE COMPRESSION METHOD AND APPARATUS, IMAGE DISPLAY METHOD AND APPARATUS, AND MEDIUM

(71) Applicants: Beijing BOE Optoelectronics Technology Co., Ltd., Beijing (CN); BOE Technology Group Co., Ltd., Beijing (CN)

(72) Inventors: Zhihua Ji, Beijing (CN); Tiankuo Shi, Beijing (CN); Xiaomang Zhang, Beijing (CN); Chingwen Kung, Beijing (CN); Rui Liu, Beijing (CN); Yifan Hou, Beijing (CN); Minglei Chu, Beijing (CN); Yanhui Xi, Beijing (CN); Yan Sun, Beijing (CN); Chenxi Zhao, Beijing (CN); Xiangjun Peng, Beijing (CN); Shuo Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 202 days.

(21) Appl. No.: 17/764,359

(22) PCT Filed: May 8, 2021

(86) PCT No.: PCT/CN2021/092369
§ 371 (c)(1),
(2) Date: Mar. 28, 2022

(87) PCT Pub. No.: WO2022/021991
PCT Pub. Date: Feb. 3, 2022

(65) Prior Publication Data
US 2022/0345723 A1    Oct. 27, 2022

(30) Foreign Application Priority Data
Jul. 31, 2020    (CN) .................. 202010760340.X

(51) Int. Cl.
*H04N 11/02*    (2006.01)
*H04N 19/172*   (2014.01)
*H04N 19/176*   (2014.01)

(52) U.S. Cl.
CPC ......... *H04N 19/172* (2014.11); *H04N 19/176* (2014.11)

(58) Field of Classification Search
CPC .................................................. H04N 19/172
(Continued)

(56) References Cited

U.S. PATENT DOCUMENTS

| 2013/0250236 A1* | 9/2013 | Tsai ............... A61B 3/14 351/206 |
| 2018/0261182 A1 | 9/2018 | Zoshi et al. |

(Continued)

FOREIGN PATENT DOCUMENTS

| CN | 106935224 A | 7/2017 |
| CN | 107809641 A | 3/2018 |

(Continued)

OTHER PUBLICATIONS

The First Office Action dated Jun. 6, 2022 corresponding to Chinese application No. 202010760340.X.

*Primary Examiner* — Leron Beck
(74) *Attorney, Agent, or Firm* — Nath, Goldberg & Meyer; Joshua B. Goldberg

(57) ABSTRACT

The present disclosure provides an image compression method, including steps of: acquiring a human-eye fixation point on an original image, and determining a fixation region and a non-fixation region of the original image according to the human-eye fixation point; and compressing the non-
(Continued)

fixation region, and generating a compressed image according to the fixation region and the compressed non-fixation region. The present disclosure also provides an image display method, an image compression apparatus, an image display apparatus, and a computer readable medium.

16 Claims, 5 Drawing Sheets

(58) Field of Classification Search
USPC .......................................... 375/240.01–240.29
See application file for complete search history.

(56) References Cited

U.S. PATENT DOCUMENTS

| | | | |
|---|---|---|---|
| 2020/0183166 A1* | 6/2020 | Dai | G02B 27/0093 |
| 2020/0265771 A1* | 8/2020 | Parks | G06T 9/00 |
| 2020/0279534 A1* | 9/2020 | Ji | G09G 3/36 |
| 2021/0027541 A1* | 1/2021 | Chao | G06T 15/10 |

FOREIGN PATENT DOCUMENTS

| | | |
|---|---|---|
| CN | 108076384 A | 5/2018 |
| CN | 108391133 A | 8/2018 |
| CN | 108665521 A | 10/2018 |
| CN | 108733202 A | 11/2018 |
| CN | 110023881 A | 7/2019 |
| CN | 110226316 A | 9/2019 |
| IN | 108270997 A | 7/2018 |
| WO | 2014085438 A2 | 6/2014 |

* cited by examiner

Rearranged image

IMAGE COMPRESSION METHOD AND APPARATUS, IMAGE DISPLAY METHOD AND APPARATUS, AND MEDIUM

This is a National Phase Application filed under 35 U.S.C. 371 as a national stage of PCT/CN2021/092369, filed May 8, 2021, an application claiming the benefit of Chinese Patent Application No. 202010760340.X, filed Jul. 31, 2020, the content of each of which is hereby incorporated by reference in its entirety.

TECHNICAL FIELD

The present disclosure relates to the field of image video technology, and in particular, to an image compression method, an image display method, an image compression apparatus, an image display apparatus, and a computer readable medium.

BACKGROUND

With the continuous progress of the electronic scientific and technological level, Virtual Reality (VR) or Augmented Reality (AR) technology has been increasingly applied in daily life as an advanced technology.

The existing virtual reality system generally simulates a virtual three-dimensional world through a high-performance computing system with a central processor and provides a user with sensory experience of sight, hearing, etc., so that the user feels like being personally on the scene, and can perform human-machine interaction.

SUMMARY

The present disclosure aims to solve at least one of the technical problems in the prior art, and provides an image compression method, an image display method, an image compression apparatus, an image display apparatus, and a computer readable medium.

To achieve the above objects, in a first aspect, an embodiment of the present disclosure provides an image compression method, including steps of:
  acquiring a human-eye fixation point on an original image, and determining a fixation region and a non-fixation region of the original image according to the human-eye fixation point; and
  compressing the non-fixation region, and generating a compressed image according to the fixation region and the compressed non-fixation region.

In some embodiments, the step of acquiring a human-eye fixation point on an original image includes:
  acquiring a user-side image including eyes of a user, and detecting a state of the eyes according to the user-side image to determine the human-eye fixation point.

In some embodiments, the step of determining a non-fixation region of the original image according to the human-eye fixation point includes steps of:
  determining, as the fixation region, a region with a symmetrical center being the human-eye fixation point and having a predetermined shape with a predetermined size; and
  determining the remaining portion of the original image as the non-fixation region.

In some embodiments, the original image is rectangular; and the step of determining, as the fixation region, a region with a symmetrical center being the human-eye fixation point and having a predetermined shape with a predetermined size includes:
  determining the fixation region according to a preset length and width by taking the human-eye fixation point as the symmetric center.

In some embodiments, the step of compressing the non-fixation region includes steps of:
  dividing the non-fixation region into a plurality of image blocks which do not overlap with each other, and rearranging the plurality of image blocks to generate a rearranged region; and
  compressing the rearranged region.

In some embodiments, the step of compressing the rearranged region includes steps of:
  down-sampling a chrominance channel of the rearranged region in a first direction according to a preset first sampling multiple; and
  down-sampling a luminance channel and the chrominance channel of the rearranged region in a second direction according to a preset second sampling multiple;
  wherein each image block is rectangular, two of its four sides are parallel to a horizontal direction, the other two sides are parallel to a vertical direction, the first direction is one of the horizontal direction and the vertical direction, and the second direction is the other of the horizontal direction and the vertical direction; the first sampling multiple is greater than the second sampling multiple.

In some embodiments, the original image, the fixation region, each image block, the rearranged region, and the compressed image each are rectangular.

In some embodiments, before the step of down-sampling a chrominance channel of the rearranged region in a first direction according to a preset first sampling multiple, the method further includes:
  converting a color space of the rearranged region into a YUV space if the color space of the rearranged region is not the YUV space.

In a second aspect, an embodiment of the present disclosure provides an image display method, including steps of:
  generating a compressed image using the image compression method of any one of the above embodiments;
  decompressing the compressed non-fixation region to obtain a restored original image; and
  displaying the restored original image.

In some embodiments, between the step of generating a compressed image and the step of decompressing the compressed non-fixation region, further including:
  transmitting, by an application processor of an apparatus for implementing the image display method, the compressed image to a display controller.

In some embodiments, the step of decompressing the compressed non-fixation region includes:
  decompressing the compressed non-fixation region through nearest neighbor interpolation or bilinear interpolation.

In some embodiments, the compressed non-fixation region is obtained by dividing the non-fixation region into a plurality of image blocks which do not overlap with each other, rearranging the plurality of image blocks to generate a rearranged region, and compressing the rearranged region, and
  after the step of decompressing the compressed non-fixation region, the image display method further includes:

recombining the compressed rearranged region to restore each image block.

In some embodiments, the fixation region is rectangular, two of four sides of the fixation region are parallel to a horizontal direction and the other two sides are parallel to a vertical direction, and each image block is rectangular; the method further includes steps of:

adjusting the restored original image for display, if a display resolution of a display unit is greater than an image resolution of the restored original image;

wherein the fixation region is rendered according to the display resolution, down-sampling is performed on the fixation region in the horizontal direction according to a ratio of the image resolution to the display resolution, and display is performed by enabling one row at one time in the vertical direction; image blocks in the same column as the fixation region are rendered according to the display resolution, the down-sampling is performed on the image blocks in the horizontal direction according to the ratio of the image resolution to the display resolution, and display is performed by enabling multiple rows at one time in the vertical direction; up-sampling is performed on image blocks in the same row as the fixation region in the horizontal direction according to the ratio of the image resolution to the display resolution, and display is performed by enabling one row at one time in the vertical direction; and the up-sampling is performed on remaining image blocks in the horizontal direction according to the ratio of the image resolution to the display resolution, and display is performed by enabling multiple rows at one time in the vertical direction.

In a third aspect, an embodiment of the present disclosure provides an image compression apparatus, including:

one or more processors; and a storage unit configured to store one or more programs;

wherein the one or more programs, when executed by the one or more processors, cause the one or more processors to perform the image compression method of any one of the above embodiments.

In a fourth aspect, an embodiment of the present disclosure provides an image display apparatus, including:

one or more processors;

a storage unit configured to store one or more programs; and a display unit;

wherein the one or more programs, when executed by the one or more processors, cause the one or more processors to perform the image display method of any one of the above embodiments, such that the display unit displays the restored original image.

In some embodiments, the image display apparatus is a virtual reality apparatus or an augmented reality apparatus.

In a fifth aspect, an embodiment of the present disclosure provides a computer readable medium, on which a computer program is stored, wherein the computer program, when executed by a processor, implements the steps of the image compression method of any one of the above embodiments, or the steps of the image display method of any one of the above embodiments.

DETAIL DESCRIPTION OF EMBODIMENTS

Figure 1:
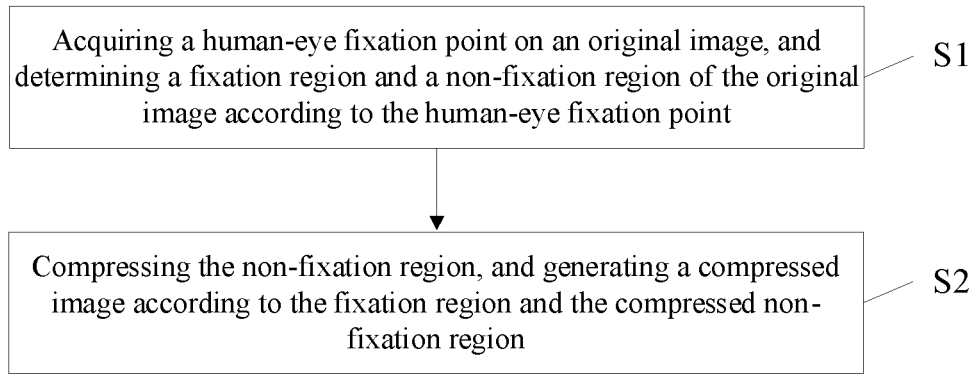
FIG. 1 is a flowchart of an image compression method according to an embodiment of the present disclosure.

In order to enable one of ordinary skill in the art to better understand the technical solutions of the present disclosure, an image compression method, an image display method, an image compression apparatus, an image display apparatus, and a computer readable medium according to the present disclosure are described in detail below with reference to the accompanying drawings.

Example embodiments will be described more fully hereinafter with reference to the accompanying drawings, but may be embodied in different forms and should not be construed as being limited to the embodiments set forth herein. Rather, these embodiments are provided so that the present disclosure will be thorough and complete, and will fully convey the scope of the present disclosure to one of ordinary skill in the art.

Terms used herein are used for describing particular embodiments only and not intended to limit the present disclosure. As used herein, the singular forms "a", "an", "the" are intended to include the plural forms as well, unless the context clearly indicates otherwise. It will be further understood that the terms "including" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that although the terms "first", "second", etc. may be used herein to describe various elements, these elements should not be limited by these terms. These terms are only used to distinguish one element from another. Thus, a first element, component, or module discussed below could be referred to as a second element, component, or module without departing from the teachings of the present disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense, unless expressly so defined herein.

The image compression method, the image display method, the image compression apparatus, the image display apparatus and the computer readable medium provided in the present disclosure may be used for acquiring a fixation point of human eyes and dividing an image into a fixation region and a non-fixation region; and performing high-definition rendering of the fixation region and low-definition rendering and compression of the non-fixation region by processing the fixation region and the non-fixation region of an original image, separately. As such, unnecessary data volume is reduced without affecting user perception, so that the problems of large amount of stored data and large transmission bandwidth corresponding to the virtual display technology are solved.

FIG. 1 is a flowchart of an image compression method according to an embodiment of the present disclosure. As shown in FIG. 1, the method includes steps S1 and S2.

Step S1 includes acquiring a human-eye fixation point (a fixation point of human eyes) on an original image, and determining a fixation region and a non-fixation region of the original image according to the human-eye fixation point.

The original image is an image to be displayed, which is rendered by a corresponding image compression apparatus according to a current state of a user-side device (a device at a user side). For example, the content to be displayed is determined according to a state of a virtual reality or augmented reality head-mounted device (such as VR glasses or AR glasses), and then, the content is rendered by a Graphics Processing Unit (GPU) of a host (such as a PC) to obtain the original image. The original image needs to be transmitted to a display controller of the host or the head-mounted device for actual display.

The human-eye fixation point is determined through real-time detection or setting of a fixed point, and the human-eye fixation point is the position in the original image on which the user's gaze settles at present. The fixation region is a region in the original image which is closer to the human-eye fixation point, namely, a region which a user is mainly focusing on at present. The non-fixation region refers to a region in the original image which is farther away from the human-eye fixation point, that is, a region that the user may see but is not focusing on.

Figure 2:
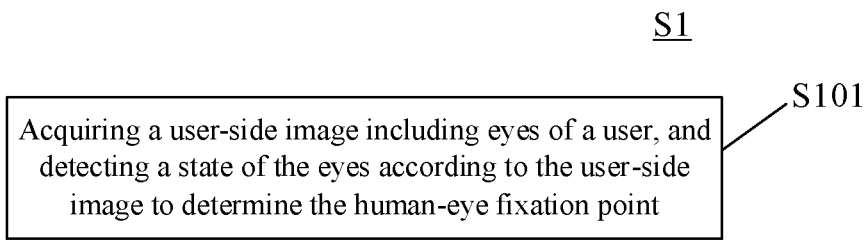
FIG. 2 is a flowchart of an implementation of step S1 according to an embodiment of the present disclosure.

FIG. 2 is a flowchart of an implementation of step S1 according to an embodiment of the present disclosure. Specifically, as shown in FIG. 2, in step S1, acquiring the human-eye fixation point on the original image includes: step S101.

Step S101 includes acquiring a user-side image including eyes of the user, and detecting a state of the eyes according to the user-side image so as to determine the human-eye fixation point.

The user-side image including the eyes of the user is acquired by a built-in image video collecting device or the user-side image transmitted from a client is received.

In some embodiments, the user-side image is an image of eyes or eyeballs of the user. The state of the eyes is detected according to the user-side image. That is, an image of pupils of the user is extracted according to the image of eyes or eyeballs of the user, a coordinate system is established based on positions of the pupils of the user, and coordinates of centers of the pupils are mapped to the original image to obtain a mapping point, or a coordinate transformation is performed according to the coordinate system established in the original image to obtain a transformation result, thereby taking the mapping point or a point corresponding to the transformation result as the human-eye fixation point.

Alternatively, the user-side image may also include eye movement information from which the human-eye fixation point is determined.

Step S2 includes compressing the non-fixation region, and generating a compressed image according to the fixation region and the compressed non-fixation region.

In step S2, the fixation region and the non-fixation region of the original image are separately processed to obtain high-definition rendering of the fixation region and low-definition rendering and compression of the non-fixation region.

In some embodiments, the method further includes: storing the compressed image for subsequent external transmission or internal transmission of the compressed image.

The embodiment of the present disclosure provides an image compression method, which may be used for acquiring a human-eye fixation point and dividing an original image into a fixation region and a non-fixation region; and separately processing the fixation region and the non-fixation region of the original image to obtain high-definition rendering of the fixation region that the user focuses on and low-definition rendering and compression of the non-fixation region that the user does not focus on (since the user does not focus on the non-fixation region, the influence on the user's perception is little although the definition is low). As such, the necessary image quality is kept and unnecessary data volume is reduced without affecting user perception, so that the problems of large storage data volume and large transmission bandwidth corresponding to the virtual display technology are solved.

Figure 3:
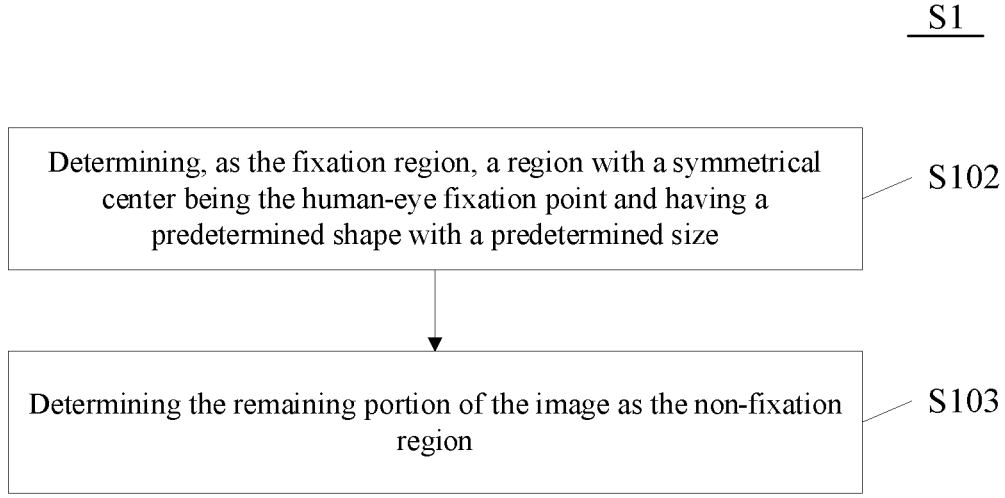
FIG. 3 is a flowchart of another implementation of step S1 according to an embodiment of the present disclosure.

FIG. 3 is a flowchart of another implementation of step S1 according to an embodiment of the present disclosure. Specifically, as shown in FIG. 3, in step S1, determining the non-fixation region of the image according to the human-eye fixation point includes: step S102 and step S103.

Step S102 includes determining, as the fixation region, a region with a symmetrical center being the human-eye fixation point and having a predetermined shape with a predetermined size.

The fixation region may be circular, rectangular or of other shapes. Preferably, the fixation region is rectangular from the perspective of compression coding.

In some embodiments, a region with a symmetrical center being the human-eye fixation point and the number of pixels (pixel number) meeting a preset number condition, is determined as the fixation region.

Figure 4:
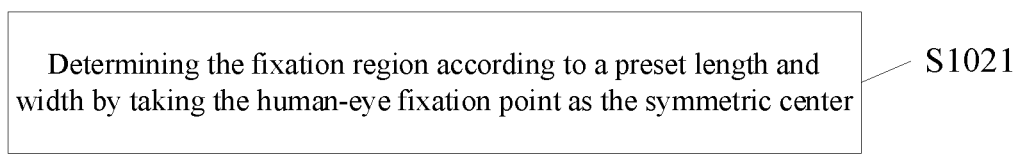
FIG. 4 is a flowchart of an implementation of step S102 according to an embodiment of the present disclosure.

FIG. 4 is a flowchart of an implementation of step S102 according to an embodiment of the present disclosure. Specifically, the original image is rectangular, and the fixation region is also rectangular; as shown in FIG. 4, in step S102, determining, as the fixation region, a region with a symmetrical center being the human-eye fixation point and having a predetermined shape with a predetermined size includes: step S1021.

Step S1021 includes determining the fixation region according to a preset length and width by taking the human-eye fixation point as the symmetric center.

The length and width of the fixation region may be adaptively set according to parameters of the original image, such as brightness, contrast, gray distribution, color distribution and pixel number and the like; the length and width of the fixation region are smaller than any one of a length and a width of the original image; and sides of the rectangular fixation region are parallel to corresponding sides of the original image, respectively. That is, the fixation region is a "small rectangle" in the rectangular original image.

Step S103 includes determining the remaining portion of the image as the non-fixation region.

The embodiment of the present disclosure provides an image compression method, which may be used for determining the fixation region and the non-fixation region by means of the detected human-eye fixation point to realize division of the original image.

Figure 5:
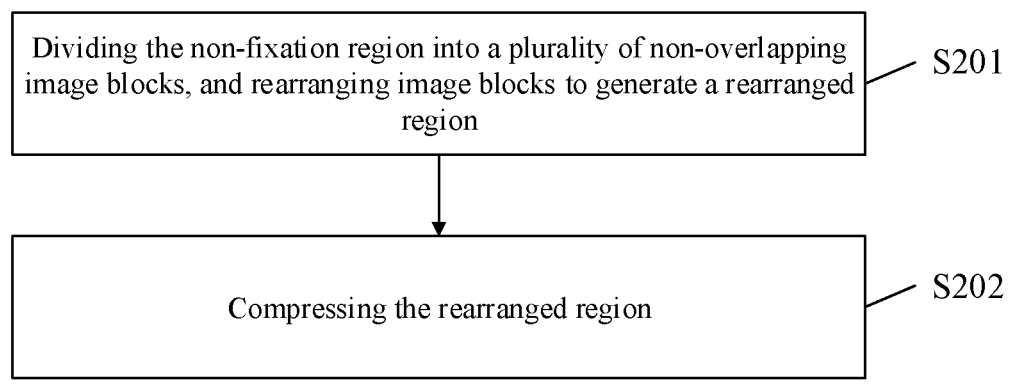
FIG. 5 is a flowchart of an implementation of step S2 according to an embodiment of the present disclosure.

FIG. 5 is a flowchart of an implementation of step S2 according to an embodiment of the present disclosure. Specifically, as shown in FIG. 5, in step S2, compressing the non-fixation region includes: step S201 and step S202.

Step S201 includes dividing the non-fixation region into a plurality of non-overlapping image blocks (a plurality of image blocks which do not overlap with each other), and rearranging the image blocks to generate a rearranged region.

The non-fixation region may be divided by using any dividing method according to the parameters of the non-fixation region, such as brightness, contrast, gray distribution, color distribution, pixel number and the like; the rearranged region generated by rearranging the divided image blocks may have a regular shape or an irregular shape.

In some embodiments, the original image, the fixation region, the image block, the rearranged region, and the compressed image are all rectangular, which has a high coding efficiency and a low coding complexity from the perspective of compression coding.

Figure 5A:
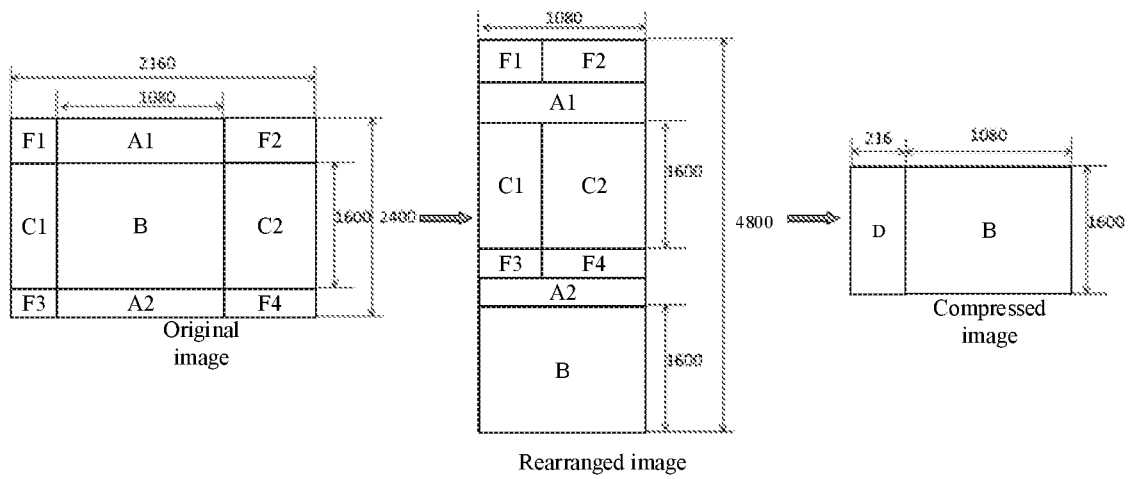
FIG. 5a is a schematic diagram of an image processing process of another image compression method according to an embodiment of the present disclosure.

For example, FIG. 5a is a schematic diagram of an image processing process of another image compression method according to an embodiment of the present disclosure. As shown in FIG. 5a, B is the fixation region, which has a width (a size in the horizontal direction in FIG. 5a, represented by the number of pixels) of 1080, which is half of a width of 2160 of the original image. The division of the non-fixation region into the image blocks is performed along extension lines of sides of the region B, thus obtaining image blocks A1, A2, C1, C2, F1, F2, F3 and F4; where a width of each of image blocks A1 and A2 is necessarily the same as that of the region B. The width of the region B is half of that of the original image, so the sum of widths of image blocks C1 and C2, the sum of widths of image blocks F1 and F2, and the sum of widths of image blocks F3 and F4 each are also equal to the width of the region B. In this way, the image blocks may be rearranged in the shape of the rearranged image in FIG. 5a, and then the rearranged region is compressed and rotated according to the optimized arrangement to obtain a region D, so that the original image, the fixation region, the image blocks, the rearranged region, and the compressed image are all rectangular.

Step S202 includes compressing the rearranged region.

Figure 6:
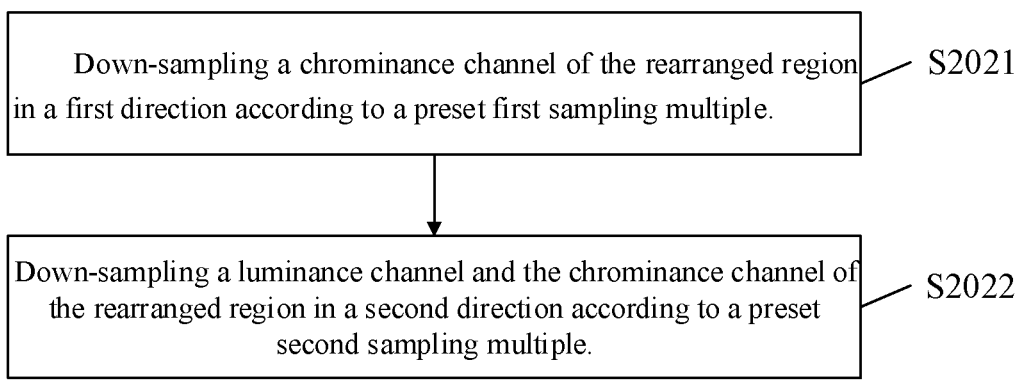
FIG. 6 is a flowchart of an implementation of step S202 according to an embodiment of the present disclosure.

FIG. 6 is a flowchart of an implementation of step S202 according to an embodiment of the present disclosure. Specifically, as shown in FIG. 6, in step S202, compressing the rearranged region includes: step S2021 and step S2022.

Step S2021 includes down-sampling a chrominance channel of the rearranged region in a first direction according to a preset first sampling multiple.

Step S2022 includes down-sampling a luminance channel and the chrominance channel of the rearranged region in a second direction according to a preset second sampling multiple.

Each image block obtained by division in step S201 is rectangular, two of its four sides are parallel to the horizontal direction, the other two sides are parallel to a vertical direction. The first direction is one of the horizontal direction and the vertical direction, and the second direction is the other of the horizontal direction and the vertical direction.

The first sampling multiple is greater than the second sampling multiple. Similarly, each sampling multiple may be adaptively set according to parameters of the non-fixation region, such as brightness, contrast, gray distribution, color distribution, and pixel number and the like.

Specifically, the down-sampling is a process of reducing the rearranged region; because the luminance channel, i.e., a Y channel, contains more image detail information, and the chrominance channel, i.e., a U channel and a V channel, contains less image detail information, when compression is performed in a YUV space, the luminance channel and the chrominance channel are sampled at different intervals and sampling multiples, for the purpose of balancing an image compression ratio and a peak signal-to-noise ratio of the non-fixation region.

In some embodiments, before down-sampling the chrominance channel of the rearranged region in the first direction according to the preset first sampling multiple, step S2021 further includes: converting a color space of the rearranged region into a YUV space if the color space of the rearranged region is not the YUV space.

It should be noted that step S2011 and step S2022 are only optional implementation for compression of the rearranged region in the present disclosure, and do not limit the technical solutions of the present disclosure. The compression encoding performed in other different directions and color spaces is also applicable to the technical solutions of the present disclosure.

The embodiment of the present disclosure provides an image compression method, which may be used for image rearranging for the irregular non-fixation region, so as to facilitate subsequent compression coding, thereby improving the coding efficiency and reducing the complexity.

Figure 7:
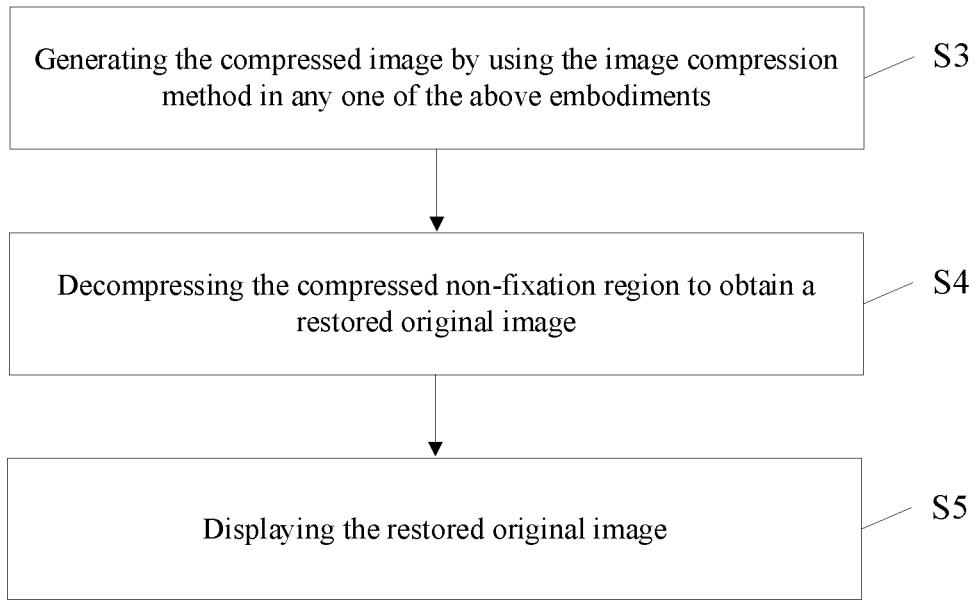
FIG. 7 is a flowchart of an image display method according to an embodiment of the present disclosure.

FIG. 7 is a flowchart of an image display method according to an embodiment of the present disclosure. As shown in FIG. 7, the method includes steps S3 to S5.

Step S3 includes generating the compressed image by using the image compression method in any one of the above embodiments.

The generated compressed image includes the fixation region and the compressed non-fixation region. In some embodiments, the fixation region is lossless compressed.

Step S4 includes decompressing the compressed non-fixation region to obtain a restored original image.

A display controller may restore the original image according to the decompression method corresponding to the compression method, to generate the restored original image for actual display. The generated restored original image includes an original fixation region and a non-fixation region losing some image details and color information. That is, the resolution of the restored original image is the same as that of the original image, but the non-fixation region of the restored original image contains less actual information than that of the original image.

In some embodiments, the method further includes: performing image enhancement processing on a portion corresponding to the non-fixation region in the restored original image.

In some embodiments, between step S3 of generating a compressed image and step S4 of decompressing the compressed non-fixation region, the method further includes: transmitting, by an application processor of the apparatus for implementing the method, the compressed image to the display controller.

The application processor, such as a graphics processor, renders a current picture to be displayed to obtain the original image, generates the compressed image by using the image compression method in any one of the above embodiments, and then transmits the compressed image to the display controller autonomously or based on a corresponding instruction, so that the display controller decompresses the compressed image for actual display.

Generally, a functional unit for graphic rendering is not integrated with a unit for displaying. For example, in a virtual reality apparatus, a graphics processor of a host is responsible for the graphic rendering (to generate the original image), and a display controller of a head-mounted device is responsible for the display. Thus, the image needs to be transmitted (e.g., from the host to the head-mounted device). In the embodiment, the original image is compressed and then transmitted, that is, the compressed image with a smaller data volume is transmitted, so the data volume for internal transmission and entering a cache is reduced, and the system load is reduced.

In some embodiments, in step S4, decompressing the compressed non-fixation region includes: decompressing the compressed non-fixation region through the nearest neighbor interpolation or the bilinear interpolation.

Step S5 includes displaying the restored original image.

The embodiment of the present disclosure provides an image display method, which includes separately processing the fixation region and the non-fixation region of the original image and performing low-definition rendering of the non-fixation region. In this way, the necessary image quality is kept and unnecessary data volume is reduced without affecting user perception, so that the problems of a large storage data volume and a large transmission bandwidth corresponding to the virtual display technology are solved.

Figure 8:
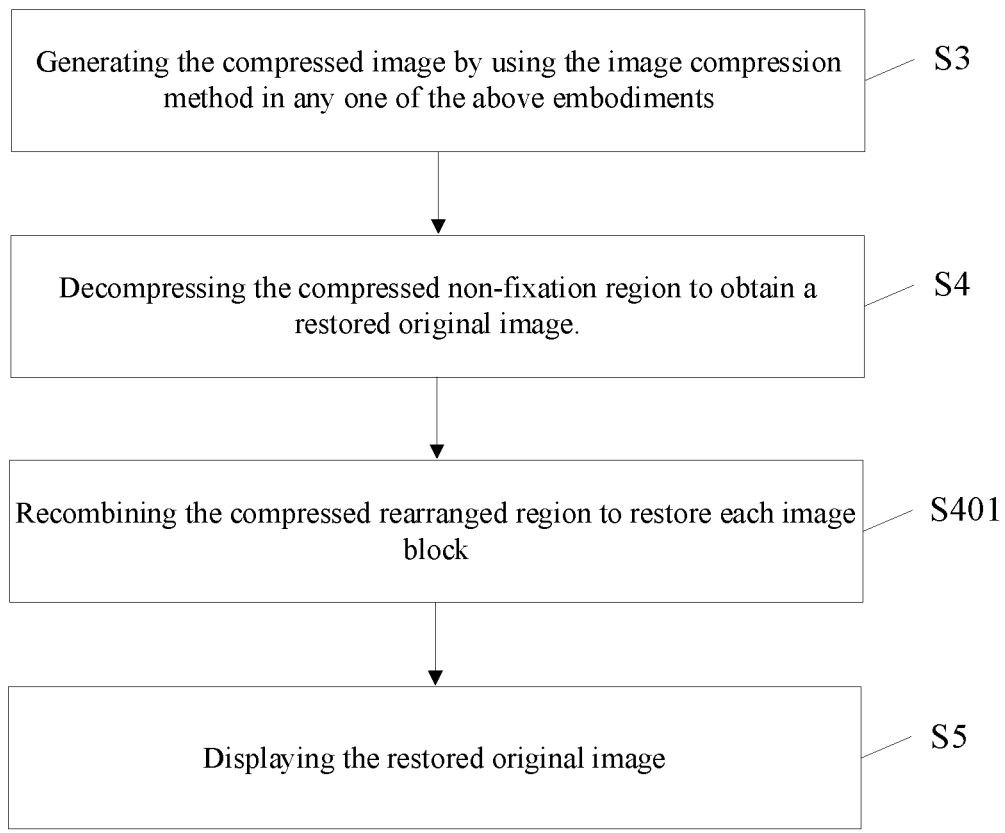
FIG. 8 is a flowchart of another image display method according to an embodiment of the present disclosure.

FIG. 8 is a flowchart of another image display method according to an embodiment of the present disclosure. As shown in FIG. 8, the method is a specific optional implementation based on the method shown in FIG. 7. The compressed non-fixation region is obtained by dividing the non-fixation region into the plurality of non-overlapping image blocks, rearranging the image blocks to generate the rearranged region, and compressing the rearranged region. Specifically, the method includes not only steps S3 to S5, but also step S401 after step S4 of decompressing the compressed non-fixation region. Only step S401 will be described in detail below.

Step S401 includes recombining the compressed rearranged region to restore each image block.

Each image block is restored according to a recombination manner corresponding to the rearrangement manner to generate the restored original image. Restored image blocks lose part of the image details and color information, but a size of each restored image block is unchanged.

Figure 9:
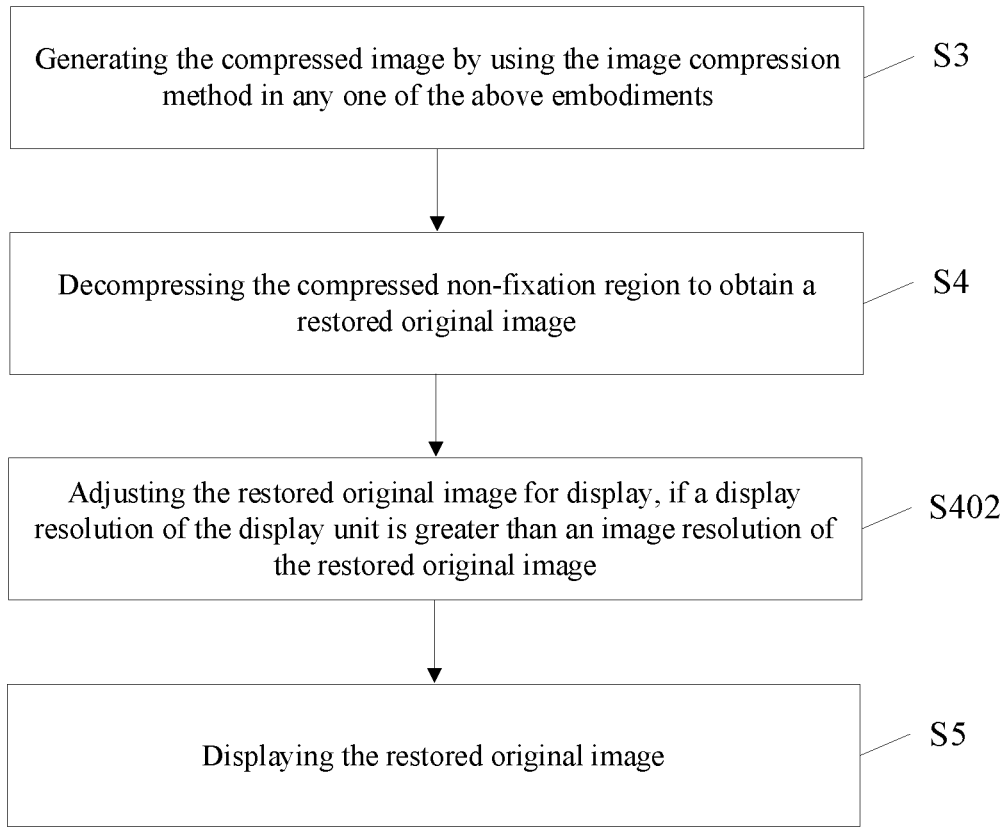
FIG. 9 is a flowchart of another image display method according to an embodiment of the present disclosure.

FIG. 9 is a flowchart of another image display method according to an embodiment of the present disclosure. As shown in FIG. 9, the method is a specific optional implementation based on the method shown in FIG. 8. The fixation region is rectangular, two of its four sides are parallel to the horizontal direction, the other two sides are parallel to the vertical direction, and the image block is rectangular. Specifically, the method includes not only steps S3 to S5, but also step S402 after step S401 of recombining the compressed rearranged region. Only step S402 will be described in detail below.

Step S402 includes adjusting the restored original image for display, if a display resolution of the display unit is greater than an image resolution of the restored original image.

The fixation region is rendered according to the display resolution, down-sampling is performed on the fixation region in the horizontal direction according to a ratio of the image resolution to the display resolution, and display is performed by enabling one row at one time in the vertical direction; image blocks in the same column as the fixation region are rendered according to the display resolution, the down-sampling is performed on the image blocks in the horizontal direction according to the ratio of the image resolution to the display resolution, and display is performed by enabling multiple rows at one time in the vertical direction; up-sampling is performed on image blocks in the same row as the fixation region in the horizontal direction according to the ratio of the image resolution to the display resolution, and display is performed by enabling one row at one time in the vertical direction; and the up-sampling is performed on the remaining image blocks in the horizontal direction according to the ratio of the image resolution to the display resolution, and display is performed by enabling multiple rows at one time in the vertical direction.

Specifically, the image blocks in the same column (same row) as the fixation region include: image blocks in which a set of column (row) sequence numbers occupied by internal pixels belongs to a set of column (row) sequence numbers of the fixation region, and the image blocks of which a set of column (row) sequence numbers partially intersects with the set of column (row) sequence numbers of the fixation region.

In the case of the same driving voltage, if display is performed by enabling one row at one time, that is, corresponding display data is transmitted to a display panel through a one-row enabled driving circuit, the driving voltage is used to drive only one row of pixel units, and thus, a driving current for the row of pixel units is larger, which achieves the high-resolution display; if display is performed by enabling multiple rows at one time, that is, corresponding display data is transmitted to the display panel through a multi-row enabled driving circuit, the driving voltage is used to drive a plurality of rows of pixel units, and accordingly, the driving current of each row of pixel units is small, which achieves the low-resolution display, and the number of the rows enabled at one time is determined according to the ratio of the image resolution and the display resolution.

The embodiment of the present disclosure provides an image display method, which may be used for displaying a recombined image on a display apparatus with unmatched resolution while keeping the original image quality and the necessary image details, so that the adaptability of image display is improved.

The image display method according to the present disclosure is described in detail below in conjunction with practical applications.

Figure 10:
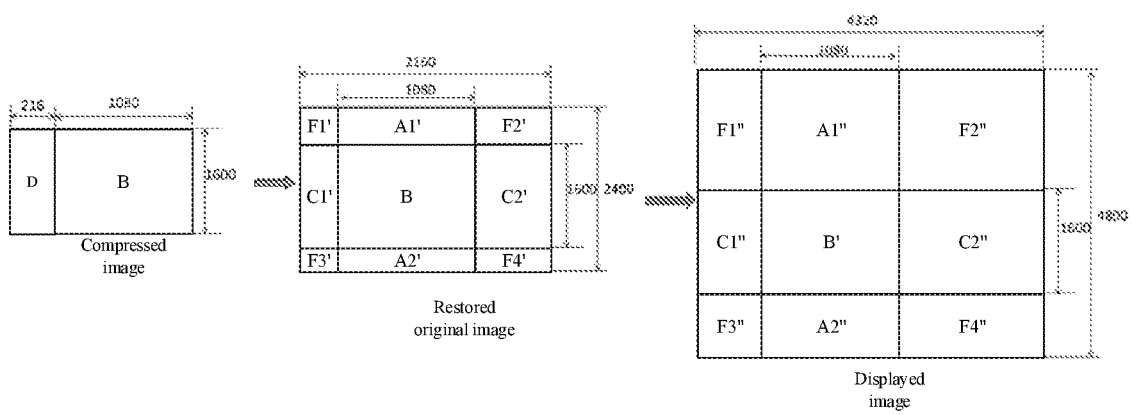
FIG. 10 is a schematic diagram of an image processing process of another image display method according to an embodiment of the present disclosure.

FIG. 10 is a schematic diagram of an image processing process of another image display method according to an embodiment of the present disclosure. As shown in FIG. 10, the method generates the compressed image using the image compression method as described in FIG. 5*a*. Specifically, the method is applied to an image display apparatus, which is a virtual reality apparatus, and a display unit of the image display apparatus has a resolution of 4320*4800.

Referring to FIG. 5*a*, the original image rendered by the image processor is rectangular and has a resolution of 2160*2400, and the corresponding color space is RGB space. Firstly, an eyeball image of a user is acquired through an internal miniature image acquisition device, a pupil center of the user is determined, and a point position of the pupil center is mapped to the original image, and the mapping point is used as the human-eye fixation point. The fixation region B is determined according to the preset length and width by taking the human-eye fixation point as a symmetrical center, and the remaining portion of the image is used as the non-fixation region. The fixation region B is a rectangle inside the original image, the fixation region B has a width (the size in the horizontal direction in the figure) that is half of the width of the original image, and a corresponding resolution of 1080*1600. The non-fixation region is divided into the plurality of non-overlapping image blocks along sides of the region B, to obtain image blocks A1, A2, C1, C2, F1, F2, F3 and F4, where the width of each of image blocks A1 and A2 is necessarily the same as that of the region B, and each of the sum of the widths of image blocks C1 and C2, the sum of the widths of image blocks F1 and F2 and the sum of the widths of image blocks F3 and F4 is necessarily equal to that of the region B as the width of the region B is half of the width of the original image. Image blocks are rearranged to generate the rearranged region, the color space of the rearranged region is converted into the YUV space. Each image block and the rearranged region are rectangular, and the resolution corresponding to the rearranged region is 1080*3200, so that the resolution of the rearranged image is 1080*4800. ½ sampling is performed on the Y channel of the rearranged region in the vertical direction, ½ sampling is performed on the U channel and the V channel of the rearranged region in the vertical direction, and ⅕ sampling is performed on the U channel and the V channel of the rearranged region in the horizontal direction. After the down-sampling is completed, the color space is converted back to the RGB space, and after an arrangement is optimized, the region D with a resolution of 216*1600 is obtained; the resulting compressed image has the resolution of 1296*1600.

Referring to FIG. 10, after the compression is completed, the internal graphics processor transmits the compressed image to the display controller, and thus, the compressed image needs to be decompressed and restored to a restored original image. The compressed rearranged region is recombined to restore the image blocks to obtain image blocks A1', A2', C1', C2', F1', F2', F3' and F4'; and the compressed image blocks are decompressed according to the sampling multiples used during the down-sampling through the nearest neighbor interpolation or the bilinear interpolation to obtain the restored original image having the resolution of 2160*2400. Because the resolution of the currently restored original image is different from the display resolution of the display unit, during display, the arranged pixel rendering is performed on the fixation region B according to the display resolution, and after rendering, the corresponding resolution is doubled; ½ sampling is performed on the fixation region B in the horizontal direction in a mode that two pixels are weighted to obtain one pixel, and display is performed by enabling one row at one time in the vertical direction, thereby obtaining a region B'. The arranged pixel rendering is performed on the image blocks A1' and A2', which are in the same column as the fixation region, according to the display resolution; ½ sampling is performed on the image blocks in the horizontal direction by interval sampling or multi-pixel weighting, and display is performed by enabling four rows at one time in the vertical direction to obtain image blocks A1" and A2". Up-sampling is performed on the image blocks C1' and C2' in the same row as the fixation region with a sampling multiple of 2 by copying or interpolation calculation in the horizontal direction, and display is performed by enabling one row at one time in the vertical direction, thereby obtaining image blocks C1" and C2". Up-sampling is performed on the remaining image blocks F1', F2', F3', and F4' with a sampling multiple of 2 in the horizontal direction, and display is performed by enabling four rows at one time in the vertical direction, thereby obtaining image blocks F1", F2", F3", and F4". Finally, the display of the restored original image is completed, and the resolution of the displayed image matches the resolution of 4320*4800 of the display unit.

An embodiment of the present disclosure provides an image compression apparatus, including:

one or more processors; a storage unit for storing one or more programs; when executed by the one or more processors, the one or more programs cause the one or more processors to implement the image compression method in any of the above embodiments.

An embodiment of the present disclosure provides an image display apparatus including:

one or more processors; a storage unit for storing one or more programs; a display unit; when executed by the one or more processors, the one or more programs cause the one or more processors to implement the image display method in any of the above embodiments, so that the display unit displays the restored original image.

In some embodiments, the image display apparatus is a virtual reality apparatus or an augmented reality apparatus. The display unit may correspond to an external display or a screen and related display elements inside the head-mounted device.

An embodiment of the present disclosure provides a computer readable medium having computer programs stored thereon. The programs, when executed by a processor, implement steps in the image compression method or the image display method in any of the above embodiments.

It will be understood by one of ordinary skill in the art that all or some of the steps of the methods, functional modules/units in the apparatuses, disclosed above may be implemented as software, firmware, hardware, and suitable combinations thereof. In a hardware implementation, the division between functional modules/units mentioned in the above description does not necessarily correspond to the division of physical components. For example, one physical component may have multiple functions, or one function or step may be performed by several physical components in cooperation. Some or all of the physical components may be implemented as a software executed by a processor, such as a central processing unit, a digital signal processor, or a microprocessor, or as a hardware, or as an integrated circuit, such as an application specific integrated circuit. Such software may be distributed on computer readable media, which may include computer storage media (or non-transitory media) and communication media (or transitory media). The term "computer storage media" includes volatile and non-volatile, removable and non-removable media implemented in any method or technology for storage of information such as computer readable instructions, data structures, program modules or other data, as is well known to one of ordinary skill in the art. Computer storage media include, but is not limited to, RAM, ROM, EEPROM, flash memory or other memory technology, CD-ROM, Digital Versatile Disk (DVD) or other optical disk storage, magnetic cassette, magnetic tape, magnetic disk storage or other magnetic storage device, or any other medium which may be used to store the desired information and which may accessed by a computer. In addition, the communication media typically include computer readable instructions, data structures, program modules or other data in a modulated data signal such as a carrier wave or other transmitting mechanism and may include any information delivery media, as is well known to one of ordinary skill in the art.

Example embodiments have been disclosed herein, and although specific terms are employed, they are used and should be interpreted in a generic and descriptive sense only and not for purposes of limitation. In some instances, it would be apparent to one of ordinary skill in the art that features, characteristics and/or elements described in connection with a particular embodiment may be used alone or in combination with features, characteristics and/or elements described in connection with other embodiments, unless expressly stated otherwise. Therefore, it will be understood by one of ordinary skill in the art that various changes in form and details may be made therein without departing from the scope of the present disclosure as set forth in the appended claims.

What is claimed is:

1. An image compression method, comprising steps of:
acquiring a human-eye fixation point on an original image, and determining a fixation region and a non-fixation region of the original image according to the human-eye fixation point; and
compressing the non-fixation region by dividing the non-fixation region into a plurality of image blocks which do not overlap with each other, and rearranging the plurality of image blocks to generate a rearranged region; and
compressing the rearranged region by down-sampling a chrominance channel of the rearranged region in a first direction according to a preset first sampling multiple; and
down-sampling a luminance channel and the chrominance channel of the rearranged region in a second direction according to a preset second sampling multiple;
wherein each image block is rectangular, two of its four sides are parallel to a horizontal direction, the other two sides are parallel to a vertical direction, the first direction is one of the horizontal direction and the vertical direction, and the second direction is the other of the horizontal direction and the vertical direction; the first sampling multiple is greater than the second sampling multiple; and
generating a compressed image according to the fixation region and the compressed non-fixation region.

2. The image compression method of claim 1, wherein the step of acquiring a human-eye fixation point on an original image comprises: acquiring a user-side image comprising eyes of a user, and detecting a state of the eyes according to the user-side image to determine the human-eye fixation point.

3. The image compression method of claim 1, wherein the step of determining a non-fixation region of the original image according to the human-eye fixation point comprises steps of: determining, as the fixation region, a region with a symmetrical center being the human-eye fixation point and having a predetermined shape with a predetermined size; and determining the remaining portion of the original image as the non-fixation region.

4. The image compression method of claim 3, wherein the original image is rectangular; and the step of determining, as the fixation region, a region with a symmetrical center being the human-eye fixation point and having a predetermined shape with a predetermined size comprises: determining the fixation region according to a preset length and width by taking the human-eye fixation point as the symmetric center.

5. The image compression method of claim 1, wherein the original image, the fixation region, each image block, the rearranged region, and the compressed image, each are rectangular.

6. The image compression method of claim 1, before the step of down-sampling a chrominance channel of the rearranged region in a first direction according to a preset first sampling multiple, further comprising: converting a color space of the rearranged region into a YUV space if the color space of the rearranged region is not the YUV space.

7. An image display method, comprising steps of:
generating a compressed image using the image compression method of claim 1;
decompressing the compressed non-fixation region to obtain a restored original image; and
displaying the restored original image.

8. The image display method of claim 7, between the step of generating a compressed image and the step of decompressing the compressed non-fixation region, further comprising: transmitting, by an application processor of an apparatus for implementing the image display method, the compressed image to a display controller.

9. The image display method of claim 7, wherein the step of decompressing the compressed non-fixation region comprises: decompressing the compressed non-fixation region through nearest neighbor interpolation or bilinear interpolation.

10. The image display method of claim 7, wherein after the step of decompressing the compressed non-fixation region, the image display method further comprises: recombining the compressed rearranged region to restore each image block.

11. The image display method of claim 10, wherein the fixation region is rectangular, two of four sides of the fixation region are parallel to a horizontal direction and the other two sides are parallel to a vertical direction, and each image block is rectangular; the method further comprises steps of: adjusting the restored original image for display, if a display resolution of a display unit is greater than an image resolution of the restored original image; wherein the fixation region is rendered according to the display resolution, down-sampling is performed on the fixation region in the horizontal direction according to a ratio of the image resolution to the display resolution, and display is performed by enabling one row at one time in the vertical direction; image blocks in the same column as the fixation region are rendered according to the display resolution, down-sampling is performed on the image blocks in the horizontal direction according to the ratio of the image resolution to the display resolution, and display is performed by enabling multiple rows at one time in the vertical direction; up-sampling is performed on image blocks in the same row as the fixation region in the horizontal direction according to the ratio of the image resolution to the display resolution, and display is performed by enabling one row at one time in the vertical direction; and up-sampling is performed on remaining image blocks in the horizontal direction according to the ratio of the image resolution to the display resolution, and display is performed by enabling multiple rows at one time in the vertical direction.

12. An image compression apparatus, comprising:
one or more processors; and
a storage unit configured to store one or more programs; wherein the one or more programs, when executed by the one or more processors, cause the one or more processors to perform the image compression method of claim 1.

13. An image display apparatus, comprising:
one or more processors;
a storage unit configured to store one or more programs; and
a display unit;
wherein the one or more programs, when executed by the one or more processors, cause the one or more processors to perform the image display method of claim 7, such that the display unit displays the restored original image.

14. The image display apparatus of claim 13, wherein the image display apparatus is a virtual reality apparatus or an augmented reality apparatus.

15. A Non-transitory computer readable medium, on which a computer program is stored, wherein the computer program, when executed by a processor, implements the steps of the image compression method of claim 1.

16. A Non-transitory computer readable medium, on which a computer program is stored, wherein the computer program, when executed by a processor, implements the steps of the image display method of claim 7.

\* \* \* \* \*